(12) United States Patent
Lin et al.

(10) Patent No.: US 9,636,633 B2
(45) Date of Patent: May 2, 2017

(54) METHOD FOR MAKING A POROUS SILICA AEROGEL COMPOSITE MEMBRANE

(71) Applicant: CHUNG YUAN CHRISTIAN UNIVERSITY, Tao-Yuan (TW)

(72) Inventors: Yi-Feng Lin, Tao-Yuan County (TW); Chia-Chieh Ko, Tao-Yuan County (TW); Kuo-Lun Tung, Tao-Yuan County (TW); Chien-Hua Chen, Tao-Yuan County (TW); Kai-Shiun Chang, Tao-Yuan County (TW)

(73) Assignee: CHUNG YUAN CHRISTIAN UNIVERSITY, Tao-Yuan (TW)

( * ) Notice: Subject to any disclaimer, the term of this patent is extended or adjusted under 35 U.S.C. 154(b) by 0 days.

(21) Appl. No.: 15/383,278

(22) Filed: Dec. 19, 2016

(65) Prior Publication Data
US 2017/0095769 A1 Apr. 6, 2017

Related U.S. Application Data

(62) Division of application No. 14/248,813, filed on Apr. 9, 2014, now Pat. No. 9,561,463.

(30) Foreign Application Priority Data

Oct. 15, 2013 (TW) .............................. 102137134 A
Mar. 19, 2014 (TW) .............................. 103110336 A

(51) Int. Cl.
*B01D 53/22* (2006.01)
*B01D 71/02* (2006.01)
(Continued)

(52) U.S. Cl.
CPC ....... *B01D 53/228* (2013.01); *B01D 67/0048* (2013.01); *B01D 69/125* (2013.01);
(Continued)

(58) Field of Classification Search
CPC ............ B01D 71/025; B01D 2053/221; B01D 69/125; B01D 53/228; B01D 67/0048;
(Continued)

(56) References Cited

U.S. PATENT DOCUMENTS 2,627,933 A 2/1953 Teter
3,932,339 A * 1/1976 McLeod .............. C09D 183/14
106/14.44

(Continued)

OTHER PUBLICATIONS

Berkeley "Making_Silica Aerogels" <http://energy.lbl.gov/ecs/aerogels/sa-making.html> 2004, 5 pgs.
(Continued)

*Primary Examiner* — Anthony Shumate
(74) *Attorney, Agent, or Firm* — WPAT, PC; Justin King

(57) ABSTRACT

The present invention provides a method for making a porous silica aerogel composite membrane. The porous silicon oxide aerogel composite membrane includes a porous aluminum oxide membrane having a plurality of macro pores with an average diameter larger than 50 nm and a porous silica aerogel membrane formed on at least one side of the porous aluminum oxide membrane and the macro pores of surface layers of the porous aluminum oxide membrane where the porous silica aerogel membrane has a plurality of meso pores with an average diameter of 2~50 nm and is derived from methyltrimethoxysilane precursor by a sol-gel synthetic method.

7 Claims, 6 Drawing Sheets

(51) Int. Cl.
- *B01D 69/12* (2006.01)
- *B01D 67/00* (2006.01)
- *B01J 20/08* (2006.01)
- *B01J 20/10* (2006.01)
- *B01J 20/28* (2006.01)

(52) U.S. Cl.
CPC ......... *B01D 71/025* (2013.01); *B01D 71/027* (2013.01); *B01J 20/08* (2013.01); *B01J 20/103* (2013.01); *B01J 20/28004* (2013.01); *B01J 20/28035* (2013.01); *B01J 20/28083* (2013.01); *B01D 2053/221* (2013.01)

(58) Field of Classification Search
CPC .............. B01D 71/027; B01J 20/28004; B01J 20/28083; B01J 20/28035; B01J 20/08; B01J 20/103
See application file for complete search history.

(56) References Cited

U.S. PATENT DOCUMENTS

| | | | |
|---|---|---|---|
| 5,139,540 A | 8/1992 | Najjar et al. | |
| 5,160,352 A | 11/1992 | Najjar et al. | |
| 5,683,532 A | 11/1997 | Kuma | |
| 6,228,145 B1 | 5/2001 | Falk-Pedersen et al. | |
| 6,738,188 B2 | 5/2004 | Singh | |
| 6,740,416 B1 | 5/2004 | Yokogawa et al. | |
| 7,019,037 B2 | 3/2006 | Zemanian et al. | |
| 7,396,382 B2 | 7/2008 | Ku et al. | |
| 7,510,598 B2 | 3/2009 | Suzuki et al. | |
| 8,262,779 B2 | 9/2012 | Liu et al. | |
| 8,302,782 B2 | 11/2012 | Falconer et al. | |
| 8,530,613 B2 | 9/2013 | Jang et al. | |
| 8,591,857 B2 | 11/2013 | Backov et al. | |
| 8,679,227 B2 | 3/2014 | Falconer et al. | |
| 8,715,392 B2 | 5/2014 | Liu | |
| 8,864,883 B2 | 10/2014 | Becze et al. | |
| 9,187,343 B2 | 11/2015 | El-Safty et al. | |
| 9,216,390 B2 | 12/2015 | Ho et al. | |
| 2002/0016397 A1* | 2/2002 | Risen, Jr. ................. | B01J 20/02 524/403 |
| 2003/0092778 A1 | 5/2003 | Zemanian et al. | |
| 2003/0157248 A1* | 8/2003 | Watkins ............... | B01D 67/003 427/256 |
| 2004/0029982 A1 | 2/2004 | Erkey et al. | |
| 2004/0038818 A1* | 2/2004 | Risen, Jr. ............... | B01D 53/02 502/407 |
| 2004/0132846 A1* | 7/2004 | Leventis ............ | C08G 18/3895 521/99 |
| 2004/0141908 A1 | 7/2004 | Hara et al. | |
| 2004/0244356 A1 | 12/2004 | Ronney | |
| 2004/0266961 A1 | 12/2004 | Solan et al. | |
| 2005/0172813 A1 | 8/2005 | Mifune et al. | |
| 2005/0200040 A1 | 9/2005 | Hara et al. | |
| 2007/0142222 A1 | 6/2007 | Erkey et al. | |
| 2007/0184208 A1* | 8/2007 | Sharma .................. | C23C 18/14 427/532 |
| 2008/0127632 A1 | 6/2008 | Finkenrath et al. | |
| 2008/0229704 A1 | 9/2008 | Augustyniak et al. | |
| 2010/0116130 A1 | 5/2010 | Carreon et al. | |
| 2011/0113958 A1 | 5/2011 | Carreon et al. | |
| 2011/0144365 A1 | 6/2011 | Park et al. | |
| 2011/0253630 A1 | 10/2011 | Bakajin et al. | |
| 2012/0031833 A1 | 2/2012 | Ho et al. | |
| 2013/0136664 A1* | 5/2013 | Bono ....................... | B01J 23/72 422/180 |
| 2013/0287661 A1 | 10/2013 | Begag et al. | |
| 2014/0352533 A1* | 12/2014 | Falconer .................. | B01J 20/16 95/51 |
| 2014/0360939 A1 | 12/2014 | Yamada et al. | |
| 2015/0203650 A1* | 7/2015 | Kolb ..................... | C01G 25/00 428/220 |
| 2016/0045841 A1 | 2/2016 | Kaplan et al. | |
| 2016/0045867 A1 | 2/2016 | Kearl et al. | |
| 2016/0074831 A1 | 3/2016 | Begag et al. | |

OTHER PUBLICATIONS

Berkeley "Silica Aerogels" <http://energy.lbl.gov/ecs/aerogels/> 2004, 4 pgs.

Aerogels_Thinner, Lighter, Stronger_NASA <http://www.nasa.gov/topics/technology/features/aerogels.html> Jul. 28, 2011, 25 pgs.

Eliasson Greenhouse Gas Control Technologies, Elsevier, May 20, 1999, excerp of p. 77.

Yi-Feng Lin et al., "Reusable methyltrimethoxysilane-based mesoporous water-repellent silica aerogel membranes for CO2 capture", 1456-1459, Sep. 26, 2013.

* cited by examiner

METHOD FOR MAKING A POROUS SILICA AEROGEL COMPOSITE MEMBRANE

CROSS REFERENCE TO RELATED APPLICATIONS

This is a divisional of U.S. Ser. No. 14/248,813, filed Apr. 9, 2014 by the same inventors, and claims priority there from. This divisional application contains rewritten claims to the restricted-out subject matter of original claims.

BACKGROUND OF THE INVENTION

1. Field of the Invention

The present invention is generally related to a membrane and method for making the same, and more particularly to a porous silica aerogel composite membrane and method for making the same and a carbon dioxide sorption device.

2. Description of the Prior Art

Due to discharge large amount of greenhouse gas, global warming becomes serious day by day. Carbon dioxide among discharged gas has the largest discharge amount and thus various carbon dioxide capture techniques have been developed. These carbon dioxide capture techniques should be selected accordingly based on their application conditions and merits or demerits for various application environments.

The carbon dioxide capture techniques include, for example, cryogenic separation, physical adsorption, chemical adsorption, and membrane separation. Cryogenic separation uses pressurization and condensation to liquefy $CO_2$ and then uses boiling point differences to separate $CO_2$ by distillation. Due to high power consumption during cryogenic separation process, it is more suitable for high added value applications. Physical adsorption uses adsorption materials for gas separation, such as active carbon, molecular sieves, zeolites but the selection of the adsorption material affects the separation efficiency. The chemical absorption uses absorbents to absorb $CO_2$. Besides, the carbon dioxide absorbent includes, for example, alkaline solution like sodium hydroxide solution, inorganic absorbent like sodium carbonate, potassium carbonate, and ammonia water, alkanolamine solution like primary alkanolamine, secondary alkanolamine, tertiary alkanolamine, and steric hindered alkanolamine solutions. Furthermore, for example, the aerogel sorbents disclosed in US patent publication no. 2013/0287661 is formed by amino-group containing alkoxysilane where the amino group is used to attract $CO_2$.

Membrane separation uses a membrane as a barrier for allowing gas passage or blockage and utilizes different types of the separation mechanisms to achieve separation effect. For example, various membranes such as dense gas separation membrane, facilitated transport mechanism and porous mechanism can be used.

In the above carbon dioxide capture techniques, cryogenic separation and physical adsorption are suitable for high partial pressure of $CO_2$ while chemical absorption and membrane separation are still applicable for low partial pressure of $CO_2$. However, physical adsorption and chemical absorption have the problem of $CO_2$ saturation of adsorption materials or absorbents. Membrane separation uses gas selectivity for separation and has a problem of little or limited $CO_2$ processing quantity. Therefore, the method of combining chemical absorption and membrane separation is expected to not only increase the $CO_2$ processing quantity but also circulate $CO_2$ absorbents to resolve the saturation problem. Thus, a suitable membrane and a $CO_2$ absorbent can be properly chosen to form a novel porous silica aerogel composite membrane and method for making the same and a carbon dioxide sorption device so as to achieve optimum $CO_2$ sorption quantity and long-term effective $CO_2$ capture for reducing operation cost of $CO_2$ capture and reducing required energy consumption to fulfill the industrial requirements.

SUMMARY OF THE INVENTION

In light of the above background, in order to fulfill the requirements of industries, one object of the present invention is to provide a porous silica aerogel composite membrane and method for making the same by using a methyltrimethoxysilane precursor to form a porous silica aerogel membrane on a porous aluminum oxide membrane to have the pore size of the porous aluminum oxide membrane be shrunk and have the porous aluminum oxide membrane become hydrophobic for $CO_2$ sorption.

Moreover, one object of the present invention is to provide a carbon dioxide sorption device by using a membrane contactor and the porous silica aerogel composite membrane according to the present invention to not only increase the $CO_2$ processing quantity but also circulate $CO_2$ absorbents so as to achieve optimum $CO_2$ sorption quantity and long-term effective $CO_2$ capture for reducing operation cost of $CO_2$ capture and reducing required energy consumption.

In order to achieve the above objects, one embodiment of the present invention provides a method for making a porous silicon oxide aerogel composite membrane, comprising: providing a porous aluminum oxide membrane having a plurality of macro pores with an average diameter larger than 50 nm wherein the porous aluminum oxide membrane has a first side and a second side; providing a silica sol prepared by a methyltrimethoxysilane precursor; performing a gelation procedure, dipping at least one side of the porous aluminum oxide membrane, the first side, the second side or the first and the second sides, into the silica sol to form a membrane coated with gel on its surface; performing an aging procedure, dipping the membrane coated with gel on its surface into ethanol for a predetermined period of aging time to form a composite membrane; performing a solvent exchange procedure, dipping the composite membrane after the aging procedure into n-hexane for a predetermined period of solvent exchange time; and performing a drying procedure, drying the composite membrane after the solvent exchange procedure so as to obtain the porous aluminum oxide membrane having porous silicon oxide aerogel as the porous silicon oxide aerogel composite membrane.

Moreover, another embodiment of the present invention provides a porous silicon oxide aerogel composite membrane, comprising: a porous aluminum oxide membrane having a plurality of macro pores with an average diameter larger than 50 nm wherein the porous aluminum oxide membrane has a first side and a second side; and a porous silica aerogel membrane formed on at least one side of the porous aluminum oxide membrane and the macro pores on surface layers of the porous aluminum oxide membrane wherein the porous silica aerogel membrane has a plurality of meso pores with an average diameter of 2~50 nm and is derived from a methyltrimethoxysilane precursor by a sol-gel synthetic method.

Furthermore, one other embodiment of the present invention provides a carbon dioxide sorption device, comprising: a membrane contactor, having a gas phase end, a liquid phase end and a porous silicon oxide aerogel composite membrane between the gas phase end and the liquid phase end; wherein the gas phase end has gas including carbon dioxide pass by and is in contact with the gas including carbon dioxide; the liquid phase end has liquid including an amine compound pass by and is in contact with liquid including an amine compound; and the porous silicon oxide aerogel composite membrane being hydrophobic is the porous silicon oxide aerogel composite membrane according to the present invention.

According to the porous silica aerogel composite membrane and method for making the same of the present invention, a porous silica aerogel composite membrane with one side (or one of two main surfaces of the membrane) being hydrophobic or with two sides being hydrophobic is provided and can be applied as a separation membrane for the method combining chemical absorption and membrane separation with no disadvantages in the prior arts like overflow, tunneling phenomena in a traditional separation system or gigantic equipment size. Moreover, according to the carbon dioxide sorption device of the present invention, the porous silica aerogel composite membrane being hydrophobic according to the present invention is used in the membrane contactor and has the advantages of being hard to be swelling compared to organic membranes, high chemical resistance and high mechanical strength. Thus, it can not only increase the $CO_2$ sorption quantity but also prolong $CO_2$ capture effect to reduce operation cost of $CO_2$ capture and reduce required energy consumption.

DESCRIPTION OF THE PREFERRED EMBODIMENTS

What is probed into the invention is a porous silica aerogel composite membrane. Detail descriptions of the steps, structure and elements will be provided in the following in order to make the invention thoroughly understood. Obviously, the application of the invention is not confined to specific details familiar to those who are skilled in the art. On the other hand, the common steps, structures and elements that are known to everyone are not described in details to avoid unnecessary limits of the invention. Some preferred embodiments of the present invention will now be described in greater detail in the following. However, it should be recognized that the present invention can be practiced in a wide range of other embodiments besides those explicitly described, that is, this invention can also be applied extensively to other embodiments, and the scope of the present invention is expressly not limited except as specified in the accompanying claims.

According to a first embodiment of the present invention, a porous silicon oxide aerogel composite membrane is disclosed. The porous silicon oxide aerogel composite membrane includes: a porous aluminum oxide membrane having a plurality of macro pores with an average diameter larger than 50 nm wherein the porous aluminum oxide membrane has a first side and a second side; and a porous silica aerogel membrane formed on at least one side of the porous aluminum oxide membrane and the macro pores on surface layers of the porous aluminum oxide membrane wherein the porous silica aerogel membrane has a plurality of meso pores with an average diameter of 2~50 nm and is derived from a methyltrimethoxysilane precursor by a sol-gel synthetic method. The "macro pores" in this specification means cavities larger than 50 nm while the "meso pores" means cavities between 2~50 nm.

Figures 1A, 1B:
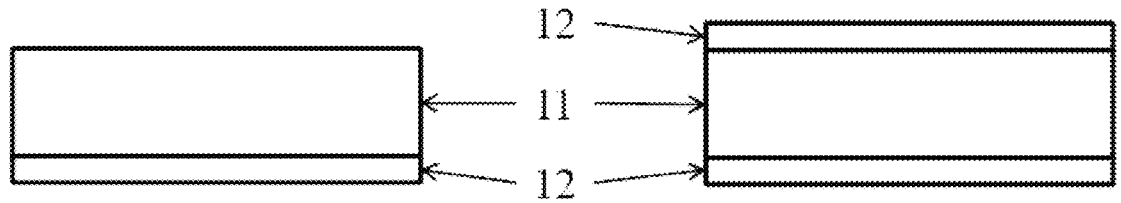
FIGS. 1(a) and 1(b) show a cross-sectional schematic diagram illustrating a porous silica aerogel composite membrane according to one embodiment of the present invention where 1(a) shows the composite membrane having one side with porous silica aerogel and 1(b) shows the composite membrane having two sides with porous silica aerogel.

Specifically, FIGS. 1(a) and 1(b) show a cross-sectional schematic diagram illustrating a porous silica aerogel composite membrane according to one embodiment of the present invention where 1(a) shows the composite membrane having one side with porous silica aerogel and 1(b) shows the composite membrane having two sides with porous silica aerogel. Symbol "11" represents a porous aluminum oxide membrane and Symbol "12" represents a porous silica aerogel membrane.

In one embodiment, the porous silicon oxide aerogel has a thickness of 40~50 nm.

In one embodiment, the porous silica aerogel membrane are formed on the first side or the second side of the porous aluminum oxide membrane and the first side or the second side formed with the porous silica aerogel membrane is hydrophobic. That is, FIG. 1(a) shows the composite membrane having one side with porous silica aerogel.

In one embodiment, the porous aluminum oxide membrane having a plurality of macro pores with an average diameter of 1~1.2 μm.

Figure 2:
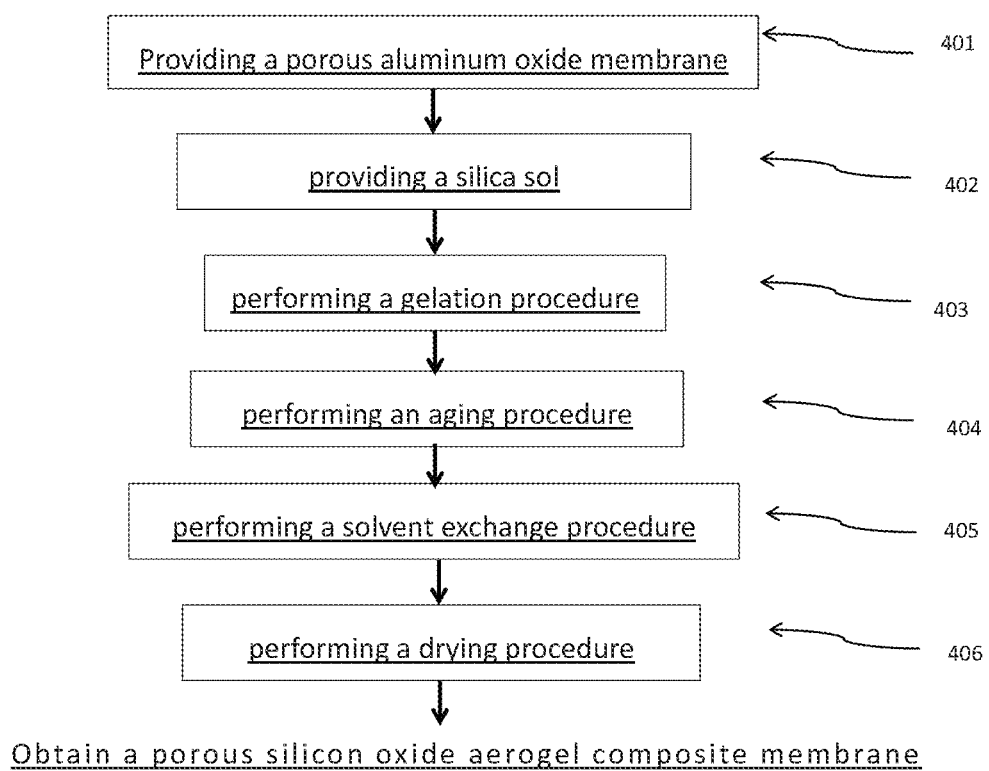
FIG. 2 shows a flow chart of a method for making a porous silica aerogel composite membrane according to one embodiment of the present invention.

According to a second embodiment of the present invention, a method for making a porous silicon oxide aerogel composite membrane is disclosed. FIG. 2 shows a flow chart of a method for making a porous silica aerogel composite membrane according to one embodiment of the present invention. The method sequentially performs the following steps: providing a porous aluminum oxide membrane 401 having a plurality of macro pores with an average diameter larger than 50 nm wherein the porous aluminum oxide membrane has a first side and a second side; providing a silica sol 402 prepared by a methyltrimethoxysiliane precursor; performing a gelation procedure 403, dipping at least one side of the porous aluminum oxide membrane, that is, the first side, the second side or the first and the second sides, into the silica sol to form a membrane coated with gel on its surface; performing an aging procedure 404, dipping the membrane coated with gel on its surface into ethanol for a predetermined period of aging time to form a composite membrane; performing a solvent exchange procedure 405, dipping the composite membrane after the aging procedure into n-hexane for a predetermined period of solvent exchange time; and performing a drying procedure 406, drying the composite membrane after the solvent exchange procedure so as to obtain the porous aluminum oxide membrane having porous silicon oxide aerogel as the porous silicon oxide aerogel composite membrane.

Figure 3:
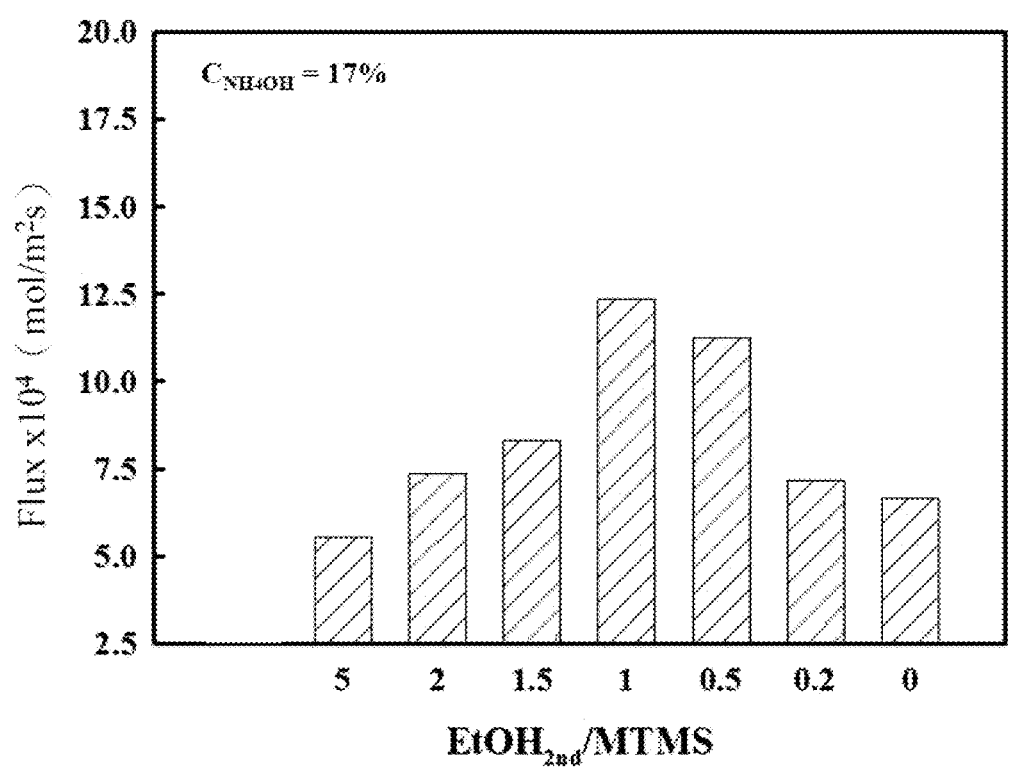
FIG. 3 shows a schematic diagram illustrating the relationship between a molar ratio of ethanol to the precursor during condensation reaction and carbon dioxide flux of the resulting composite membrane in the method of making the porous silica aerogel composite membrane according to one embodiment of the present invention.
Figure 4:
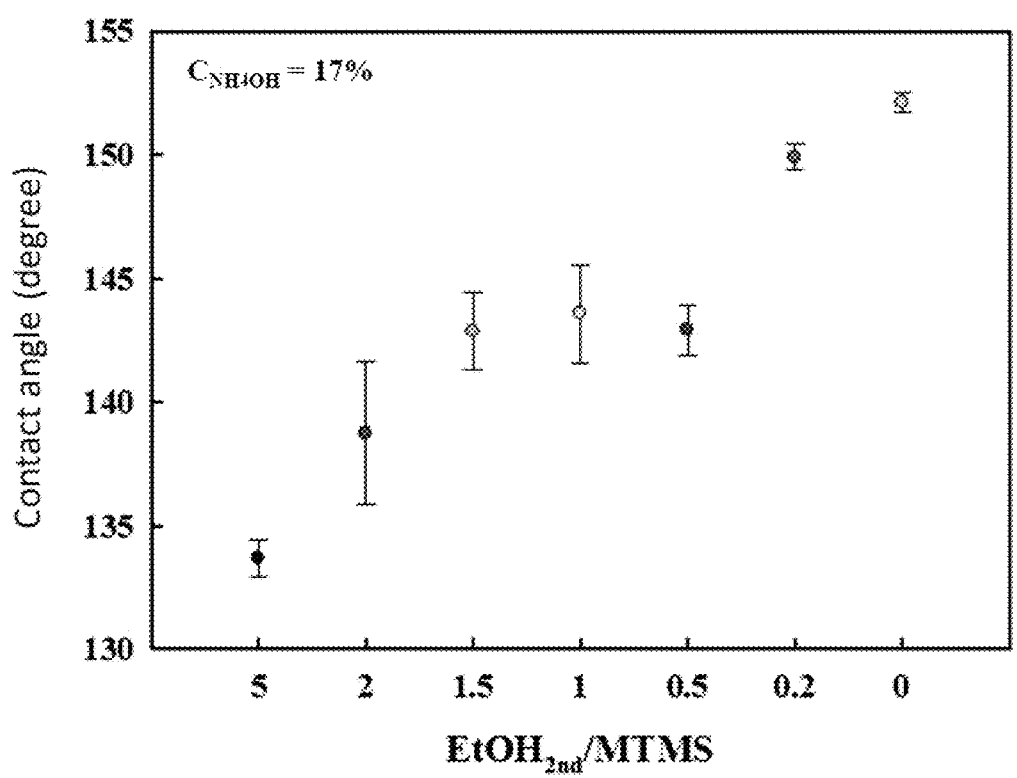
FIG. 4 shows a schematic diagram illustrating the relationship between a molar ratio of ethanol to the precursor during condensation reaction and the contact angle of the resulting composite membrane in the method of making the porous silica aerogel composite membrane according to one embodiment of the present invention.

The resulting porous silicon oxide aerogel composite membrane prepared by the above method is reviewed with the effects of the concentration of ammonia water and adding quantity of ethanol during condensation reaction to $CO_2$ sorption quantity. When the used ammonia water has concentration between 8.5~29 wt %, the $CO_2$ sorption quantity of the resulting porous silicon oxide aerogel composite membrane increases with the increase of ammonia concentration at the beginning, then reaches the optimum value (or maximum) and finally decreases with the further increase of ammonia concentration. FIG. 3 shows a schematic diagram illustrating the relationship between a molar ratio of ethanol to the precursor ($EtOH_{2nd}$/MTMS where $EtOH_{2nd}$ represents the number of moles of ethanol added during condensation reaction and MTMS represents the number of moles of methyltrimethoxysilane) during condensation reaction and carbon dioxide flux of the resulting composite membrane in the method of making the porous silica aerogel composite membrane according to one embodiment of the present invention. FIG. 4 shows a schematic diagram illustrating the relationship between a molar ratio of ethanol to the precursor during condensation reaction and the contact angle of the resulting composite membrane in the method of making the porous silica aerogel composite membrane according to one embodiment of the present invention. In FIGS. 3 and 4, during making the porous silicon oxide aerogel composite membrane, the molar ratio of ethanol to the precursor during condensation reaction is preferably 0.5~1.5, more preferably 1.0. Ammonia water is used as an alkaline catalyst. The resulting composite membrane (shrunk pore size) has a contact angle over 125° on its surface to presume that the hydrophobic moiety (—$CH_3$) is grafted on the surface of the membrane.

In the above method, the silica sol is prepared by hydrolysis reaction of a methyltrimethoxysiliane precursor added with ethanol and hydrochloric acid and then condensation reaction through adding ethanol and ammonia water to stir until becoming homogenizing. Specifically, for example, 2.04 g of methyltrimethoxysiliane, 2.07 g of ethanol and 0.27 g of hydrochloric acid (concentration of 0.14 wt %) are mixed in a wide-mouth bottle and stirred for 90 minutes at room temperature. Then, 0.69 g of ethanol ($ETOH_{2nd}$) and 0.69 g of ammonia water (concentration of 17 wt %) are added and then the mixture is stirred for 30 minutes at room temperature to perform condensation reaction. After becoming homogenizing, the silica sol is obtained.

In the gelation procedure, specifically for example the porous aluminum oxide membrane is dipped into the silica sol in a container and the hydrolysis and condensation reaction at room temperature is performed after the container is sealed to wait for gelation. The gelation time is about 2~20 hrs.

In the aging procedure, specifically for example the composite membrane after gelation is taken out to have intact gel on the surface of the membrane and then dipped in ethanol to perform aging procedure. In order to effectively strengthen porous structure of gel, ethanol solution is replaced with new every 24 hrs. The predetermined period of aging time is 30~60 hrs and preferably 48 hrs.

In the solvent exchange procedure, specifically for example the composite membrane is dipped in n-hexane for about 24 hrs to remove ethanol and unreacted substances in the membrane. That is, the predetermined period of solvent exchange time is 24 hrs.

According to a third embodiment of the present invention, a method for making a porous silicon oxide aerogel composite membrane is disclosed. The method sequentially performs the following steps: first, 1.36 g of precursor MTMS, 1.38 g of ethanol and 0.18 g of hydrochloric acid are mixed in a container, it is continued stirring at room temperature for 90 minutes; following it is added by 0.69 g of ethanol and 0.69 g of aqueous ammonia in the container, and then it was continued stirring at room temperature for 30 minutes. After mixing, it is a silica sol. It is dipping at least one side of the porous aluminum oxide membrane, that is, the first side, the second side or the first and the second sides, into the silica sol to form a membrane coated with gel on its surface; it is dipping the membrane coated with gel on its surface into ethanol for a predetermined period of aging time to form a composite membrane and changed the ethanol every day; it is taked out the dipping the membrane coated with gel on its surface into ethanol for a predetermined period of aging time to form a composite membrane; then, it is taked out the dipping composite membrane after the aging and put into n-hexane for a predetermined period of solvent exchange time; finally, it is dried the composite membrane after the solvent exchange procedure so as to obtain the porous aluminum oxide membrane having porous silicon oxide aerogel as the porous silicon oxide aerogel composite membrane.

The resulting porous silicon oxide aerogel composite membrane prepared by the above method is tested for durability. It is found that $CO_2$ sorption flux changes with time at different molar ratios of $EtOH_{2nd}$/MTMS and can reach steady flux for each molar ratio of $EtOH_{2nd}$/MTMS. Besides, it is obvious that the molar ratio of $EtOH_{2nd}$/MTMS has influence to required time to steady $CO_2$ sorption flux. When $EtOH_{2nd}$/MTMS=1 and 0.5, only little time is required to reach steady $CO_2$ sorption flux. Therefore, the composite membrane of the present invention has applicability.

The resulting porous silicon oxide aerogel composite membrane prepared by the above method is tested for reusability. At first, the porous silicon oxide aerogel composite membrane 300 is installed in the carbon dioxide sorption device 100 shown in FIG. 5. FIG. 6 shows a schematic diagram illustrating the relationship between carbon dioxide sorption flux and time in a reusability test of the porous silica aerogel composite membrane in the carbon dioxide sorption device according to one embodiment of the present invention. The reusability test is done by the following steps. At first, the composite membrane undergoes the $CO_2$ sorption experiment for one day and then is flushed with gas in a reverse direction. That is, gas flows from the gas phase end (passing $210_{in}$) and the outlet valve $210_{out}$ of the gas phase end 210 is closed to have gas pass through the membrane 300 and discharged from the liquid phase end 220. Therefore, the degree of swelling of the membrane can be reduced by the above process. Then, the $CO_2$ sorption experiment is performed again. The result shows that the composite membrane after flushed with gas in a reverse direction twice can recover its sorption flux to the starting sorption flux and can have the same steady sorption flux. It proves that the composite membrane has high stability and also excellent reusability. Thus, the composite membrane according to the present invention has great potential industrially.

Figure 5:
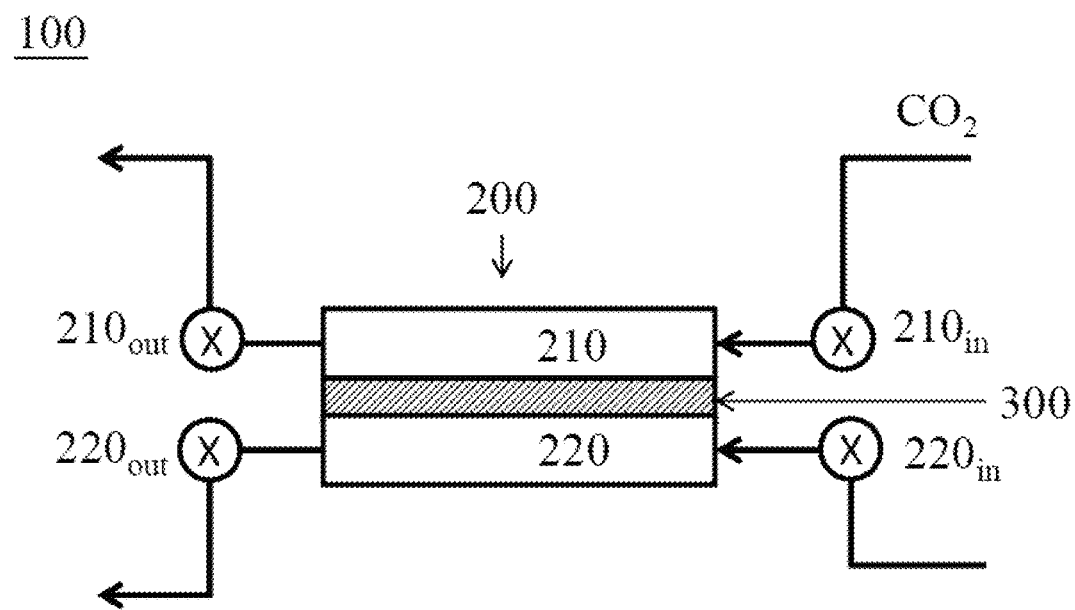
FIG. 5 shows a schematic diagram illustrating a carbon dioxide sorption device according to one embodiment of the present invention.
Figure 6:
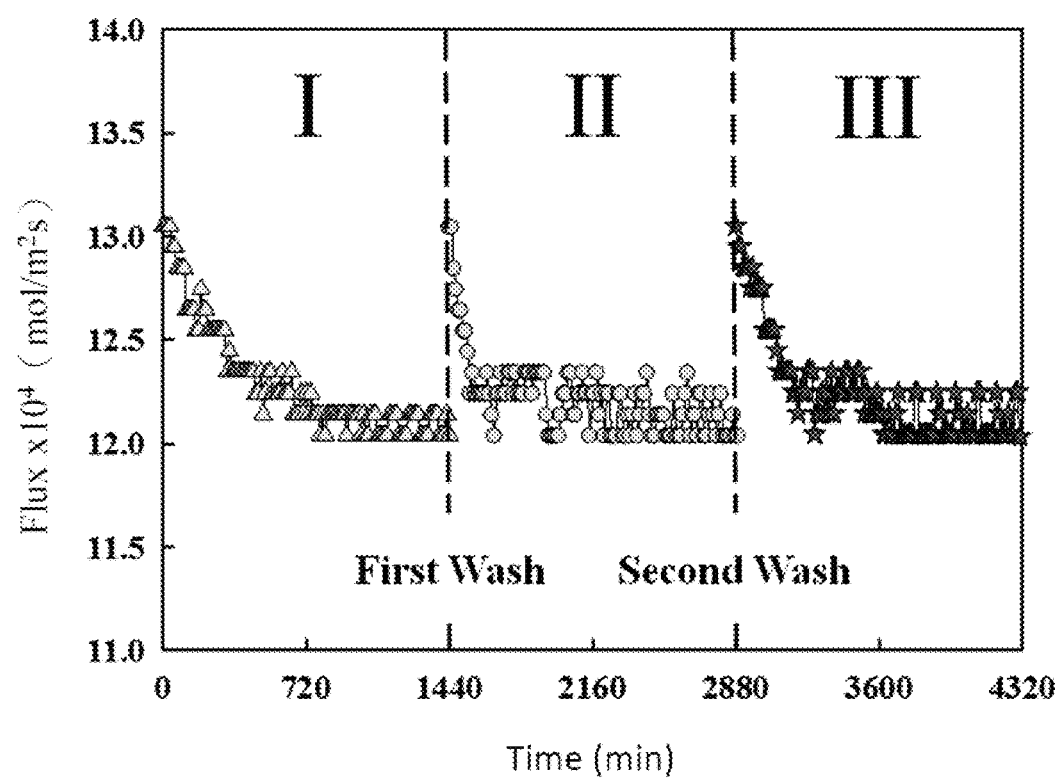
FIG. 6 shows a schematic diagram illustrating the relationship between carbon dioxide sorption flux and time in a reusability test of the porous silica aerogel composite membrane in the carbon dioxide sorption device according to one embodiment of the present invention.

Furthermore, the carbon dioxide sorption device 100 shown in FIG. 5 comprises: a membrane contactor 200, having a gas phase end 210, a liquid phase end 220 and a porous silicon oxide aerogel composite membrane 300 between the gas phase end 210 and the liquid phase end 220. The gas phase end 210 has gas including carbon dioxide pass by and is in contact with the gas including carbon dioxide. The liquid phase end 220 has liquid including an amine compound pass by and is in contact with liquid including an amine compound. The porous silicon oxide aerogel composite membrane 300 is hydrophobic and is prepared by the above method according to the present invention. In FIG. 5, 210$_{in}$ represents the inlet valve of the gas phase end 210 and 210$_{out}$ represents the outlet valve of the gas phase end 210 while 220$_{in}$ represents the inlet valve of the liquid phase end 220 and 220$_{out}$ represents the outlet valve of the liquid phase end 220. Wherein an operating condition as shown in table 1.

TABLE 1

| | |
|---|---|
| Feed gas flow rate | 200 sccm |
| | ([sccm] = cm$^3$/min) |
| Liquid feed rate | 100 cm$^3$/min |
| Absorber concentration | 1M AMP + 0.2M PZ |
| Gas feed concentration | CO$_2$/N$_2$ = 9/91 (Volume ratio) |
| Gas-liquid two-phase pressure | 0.01 bar ( Liquid > vapor) |

The solution flowing by the liquid phase end 220 is an amine compound. For example, the amine compound is primary alkanolamine, secondary alkanolamine, tertiary alkanolamine or steric hindered alkanolamine. Preferably, the amine compound is steric hindered alkanolamine. The steric hindered alkanolamine for example is 2-amino-2-methyl-1-propanol or anhydrous piperazine.

In one embodiment, the porous silicon oxide aerogel has a thickness of 40~50 nm.

In one embodiment, the porous silica aerogel membrane are formed on only one side (the first side or the second side) of the porous aluminum oxide membrane and the first side or the second side formed with the porous silica aerogel membrane is hydrophobic.

In one embodiment, the porous aluminum oxide membrane having a plurality of macro pores with an average diameter of 1~1.2 μm. In one embodiment, the porous aluminum oxide membrane has a thickness of 2.4 mm.

In conclusion, according to the porous silica aerogel composite membrane and method for making the same of the present invention, a porous silica aerogel composite membrane with one side (or one of two main surfaces of the membrane) being hydrophobic or with two sides being hydrophobic is provided and can be applied as a separation membrane for the method combining chemical absorption and membrane separation with no disadvantages in the prior arts like overflow, tunneling phenomena in a traditional separation system or gigantic equipment size. Moreover, according to the carbon dioxide sorption device of the present invention, the porous silica aerogel composite membrane being hydrophobic according to the present invention is used in the membrane contactor and has the advantages of being hard to be swelling compared to organic membranes, high chemical resistance and high mechanical strength. Thus, it can not only increase the CO$_2$ sorption quantity but also prolong CO$_2$ capture effect to reduce operation cost of CO$_2$ capture and reduce required energy consumption.

Obviously many modifications and variations are possible in light of the above teachings. It is therefore to be understood that within the scope of the appended claims the present invention can be practiced otherwise than as specifically described herein. Although specific embodiments have been illustrated and described herein, it is obvious to those skilled in the art that many modifications of the present invention may be made without departing from what is intended to be limited solely by the appended claims.

What is claimed is:

1. A method for making a porous silicon oxide aerogel composite membrane, comprising:
    providing a porous aluminum oxide membrane having a plurality of macro pores with an average diameter larger than 50 nm wherein the porous aluminum oxide membrane has a first side and a second side;
    providing a silica sol prepared by a methyltrimethoxysilane precursor;
    performing a gelation procedure, dipping at least one side of the porous aluminum oxide membrane, that is, the first side, the second side or the first and the second sides, into the silica sol to form a membrane coated with gel on its surface;
    performing an aging procedure, dipping the membrane coated with gel on its surface into ethanol for a predetermined period of aging time to form a composite membrane;
    performing a solvent exchange procedure, dipping the composite membrane after the aging procedure into n-hexane for a predetermined period of solvent exchange time; and
    performing a drying procedure, drying the composite membrane after the solvent exchange procedure so as to obtain the porous aluminum oxide membrane having porous silicon oxide aerogel as the porous silicon oxide aerogel composite membrane.

2. The method according to claim 1, wherein in the gelation procedure only one side of the porous aluminum oxide membrane is dipped into the silica sol to form the coated membrane having one side coated with gel.

3. The method according to claim 1, wherein the silica sol is prepared by hydrolysis reaction of the methyltrimethoxysilane precursor added with ethanol and hydrochloric acid and then condensation reaction through adding ethanol and ammonia water to stir until becoming homogenizing.

4. The method according to claim 3, wherein ammonia water is 17 wt % in a reaction mixture and an amount of the added ethanol during condensation reaction to the methyltrimethoxysilane precursor is a molar ratio of 1.

5. The method according to claim 3, wherein the predetermined period of aging time is 48 hrs and the predetermined period of solvent exchange time is 24 hrs.

6. The method according to claim 1, wherein the porous silicon oxide aerogel has an average diameter of 8~9 nm.

7. The method according to claim 1, wherein the porous silicon oxide aerogel has a thickness of 40~50 nm.

* * * * *